(12) United States Patent
Glatz et al.

(10) Patent No.: US 11,935,680 B2
(45) Date of Patent: Mar. 19, 2024

(54) STATOR FOR AN ELECTRIC MOTOR

(71) Applicant: Minebea Mitsumi Inc., Nagano (JP)

(72) Inventors: Karl-Heinz Glatz, Obereschach (DE); Peter Würfel, Villingen-Schwenningen (DE); Vladimir Popov, Villingen-Schwenningen (DE); Mark Kempa, Villingen-Schwenningen (DE); Peter Borsai, Tuttlingen (DE)

(73) Assignee: Minebea Mitsumi Inc., Nagano (JP)

( * ) Notice: Subject to any disclaimer, the term of this patent is extended or adjusted under 35 U.S.C. 154(b) by 80 days.

(21) Appl. No.: 17/500,000

(22) Filed: Oct. 13, 2021

(65) Prior Publication Data

US 2022/0115174 A1    Apr. 14, 2022

(30) Foreign Application Priority Data

Oct. 13, 2020 (DE) .......................... 102020126845.9

(51) Int. Cl.
| | |
|---|---|
| *H02K 1/14* | (2006.01) |
| *H01F 27/245* | (2006.01) |
| *H01F 27/26* | (2006.01) |
| *H02K 1/16* | (2006.01) |
| *H02K 15/02* | (2006.01) |

(52) U.S. Cl.
CPC ......... *H01F 27/245* (2013.01); *H01F 27/263* (2013.01); *H02K 1/148* (2013.01); *H02K 1/165* (2013.01); *H02K 15/024* (2013.01)

(58) Field of Classification Search
CPC ........ H01F 3/02; H01F 27/245; H01F 27/263; H02K 1/148; H02K 1/165; H02K 15/024; H02K 3/325; H02K 15/022
See application file for complete search history.

(56) References Cited

U.S. PATENT DOCUMENTS

| 6,429,568 B1 | 8/2002 | Shen et al. | |
| 10,110,076 B2 * | 10/2018 | Li | .............................. H02K 1/16 |

(Continued)

FOREIGN PATENT DOCUMENTS

| DE | 19934858 | 1/2001 |
| DE | 102014113650 | 3/2015 |

(Continued)

*Primary Examiner* — Leda T Pham
(74) *Attorney, Agent, or Firm* — Grossman, Tucker, Perreault & Pfleger, PLLC; Steven J. Grossman

(57) ABSTRACT

A stator for an electric motor is provided, the stator comprising a hollow cylindrical stator yoke and comprising a stator star arranged within the stator yoke and including a plurality of radially outwardly extending stator teeth having tips contacting, in the assembled state, corresponding connection positions on the inner circumference of the stator yoke, wherein the stator yoke and the stator star are each formed by a laminated metal sheet pack, wherein the metal sheet pack of the stator star comprises sheet metal layers of stator sheets, closed in the circumferential direction, comprising stator teeth connected with each other via pole shoe bridges and sheet metal layers of individual stator teeth spaced with respect to each other in the circumferential direction. Each of the pole shoe bridges may have at least one material recess extending in the radial direction.

10 Claims, 6 Drawing Sheets

(56) References Cited

U.S. PATENT DOCUMENTS

Figure 1:
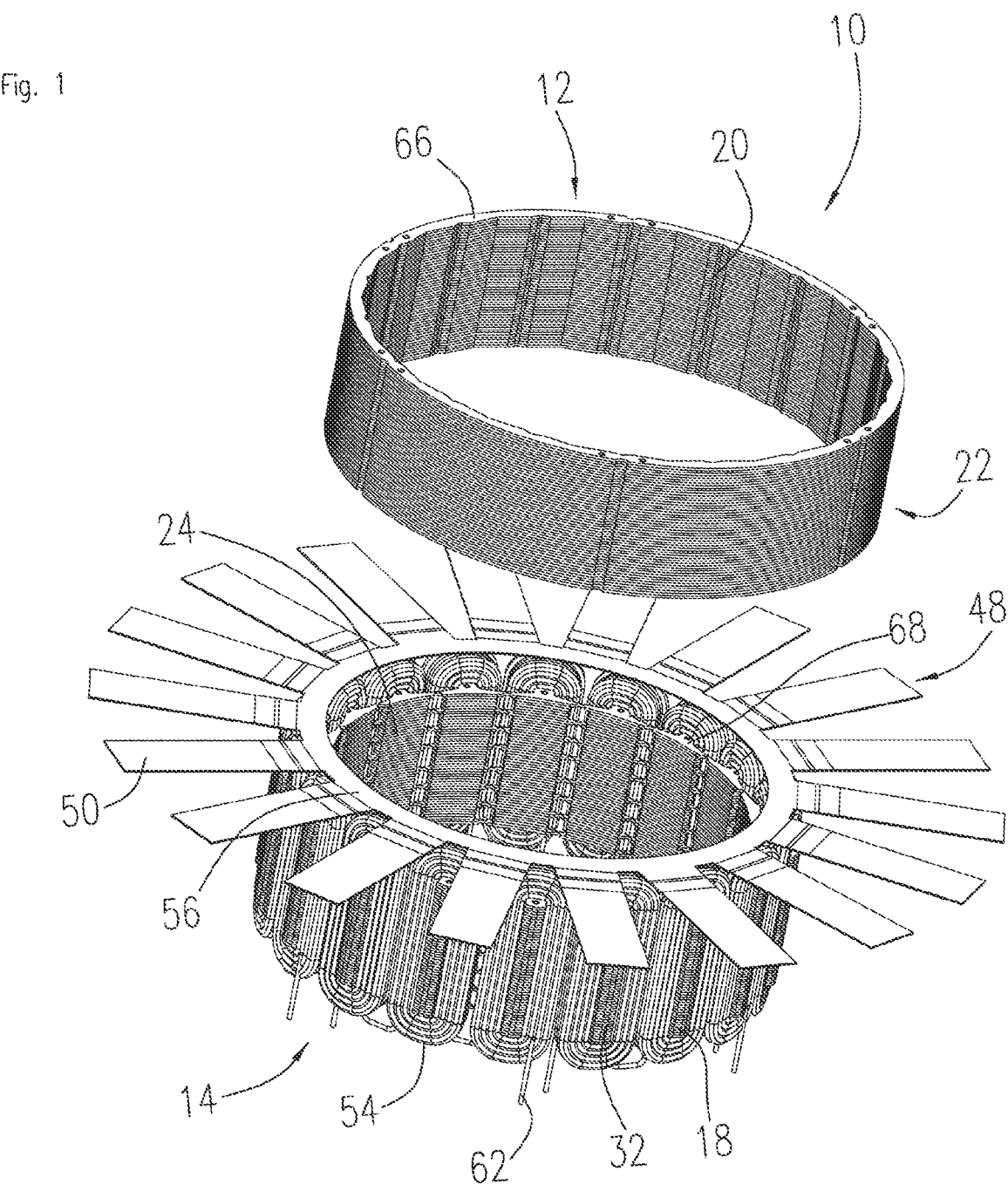

| | | | |
|---|---|---|---|
| 2002/0140312 A1* | 10/2002 | Ikeda .................... | H02K 1/148 |
| | | | 310/216.045 |
| 2008/0191578 A1* | 8/2008 | Evans .................... | H02K 1/148 |
| | | | 310/216.012 |
| 2015/0054378 A1* | 2/2015 | Arnoldi ................. | H02K 15/02 |
| | | | 310/216.007 |
| 2015/0084447 A1 | 3/2015 | Kamiya | |
| 2018/0115202 A1 | 4/2018 | Hirotani et al. | |
| 2019/0036391 A1* | 1/2019 | Brohm .................. | H02K 3/522 |
| 2020/0136486 A1 | 4/2020 | Abraham | |

FOREIGN PATENT DOCUMENTS

| | | |
|---|---|---|
| JP | 63174531 | 7/1988 |
| JP | 02211027 | 8/1990 |
| JP | 2016135060 | 7/2016 |

* cited by examiner

Detail X

STATOR FOR AN ELECTRIC MOTOR

FIELD

The invention relates to a stator for an electric motor.

BACKGROUND

From DE 10 2016 205 538 A1, a stator for an electric motor is known, comprising a hollow cylindrical stator yoke, comprising a stator star arranged in the stator yoke. The stator star comprises a plurality of radially outwardly extending stator teeth having tips which, in the assembled state, contact corresponding connection positions on the inner circumference of the stator yoke.

SUMMARY

An electric motor is provided, the electric motor comprising a hollow cylindrical stator yoke and comprising a stator star arranged within the stator yoke and including a plurality of radially outwardly extending stator teeth having tips contacting, in the assembled state, corresponding connection positions on the inner circumference of the stator, wherein the stator yoke and the stator star are each formed by a laminated metal sheet pack, wherein the metal sheet pack of the stator star comprises sheet metal layers of stator sheets, closed in the circumferential direction, comprising stator teeth connected with each other via pole shoe bridges and sheet metal layers of individual stator teeth spaced with respect to each other in the circumferential direction. This allows providing a generic stator for an electric motor which is improved with respect to its manufacture and operation.

In some examples, each of the pole shoe bridges has at least one material recess extending in the radial direction.

The stator of an electric motor typically forms a fixed motor part of the electric motor, while a rotor of the electric motor forms a motor part of the electric motor rotatably moving relative to the stator of the electric motor. In an electric motor formed as an internal rotor motor the stator is usually provided with a stator yoke on which stator teeth are arranged radially with respect to the center, protruding towards the inside. The ends facing the rotor of the stator teeth each form a pole shoe. Stator windings are applied to the stator teeth generating a magnetic field in electromotive operation.

To provide access to the stator teeth from the outside during the manufacture of the stator for applying windings to the stator teeth and thus to enable an advantageously high winding fill factor, the stator has a bipartite structure. The stator comprises a stator star having a plurality of stator teeth each radially outwardly extending from a pole shoe. In addition, the stator comprises a hollow cylindrical stator yoke. The stator yoke and the stator star have each been formed by a stamped metal sheet pack. The stator star and the stator yoke have each been made from individual stamped stator sheets packaged into metal sheet packs in a mechanically stable bond. After applying the stator windings to the stator teeth of the stator star, the stator star provided with the stator windings is inserted into the stator yoke forming a magnetic yoke ring and, in particular, is joined to the stator yoke by means of pressing or shrinking. The stator windings can be wound prior to joining the stator star to the stator yoke, for example, directly, for example, by means of a flyer winding machine, onto the stator teeth. The stator star comprises, in particular, an electrically insulating coating having a maximum layer thickness of 200 μm. In particular, the layer thickness of the coating can be between 100 μm and 200 μm. The coating can be applied, in particular, on the stator star by means of electrophoretic deposition.

The stator yoke is, in particular, a metal sheet pack of annular stator sheets. The stator star is formed by a metal sheet pack comprising star-shaped stator teeth. The metal sheet pack of the stator star is comprised of a combination of sheet layers comprising stator sheets, closed in the circumferential direction, comprising stator teeth connected with each other via pole shoe bridges, and sheet layers consisting of individual stator teeth spaced with respect to each other in the circumferential direction. The sheet layers comprising stator sheets, closed in the circumferential direction, in which the stator teeth are connected with each other on the side of the pole shoe via pole shoe bridges achieve a mechanically strong bond for the stator star. The pole shoe bridges connecting the pole shoes of the stator sheets of the stator star, closed in the circumferential direction, each have at least one radially extending material recess. In particular, all pole shoe bridges each have, in particular, identical material recesses. In particular, each pole shoe bridge comprises exactly one material recess. The material recesses result in each pole shoe bridge having a reduction in material thickness whereby a magnetic flux between two adjacent pole shoes via the pole shoe bridge connecting the pole shoes can be advantageously reduced.

The material recesses can be made in the pole shoe bridges, in particular, after stamping the stator sheets closed in the circumferential direction. Preferably, however, the material recesses in the pole shoe bridges are already made during stamping of the stator sheets of the stator star closed in the circumferential direction. Preferably, the material recesses are arranged on the rotor side of the pole shoe bridges. The material recesses are preferably at least essentially formed as circular segments. In particular, the material recesses are at least essentially formed to be semicircular. The geometry of the material recesses, in particular forming the material recesses as circular segments, can advantageously help at least to reduce or to completely avoid deformations resulting from stamping in the region of the pole shoe bridges.

In an example, the material recesses are arranged to be aligned as seen in the axial direction, which advantageously facilitates ease of manufacture of the stator, in particular of the stator star. Alternatively, the material recesses, in particular, can be in the form of so-called moving notches, which are offset from each other as seen in the axial direction. The offset arrangement of the material recesses can advantageously achieve stiffness of the stator sheets of the stator star closed in the circumferential direction, and thus of the entire stator star.

In some examples, a minimum radial material extension of the pole shoe bridges, in the region of the material recess, corresponds to 0.2 to 0.5 times a radial material extension of the pole shoe bridges outside of the region of the material recess.

Preferably, the minimum radial material extension of the pole shoe bridges in the region of the material recess corresponds to 0.3 to 0.4 times the radial material extension of the pole shoe bridges outside of the region of the material recess. It is also provided that a main extension of the material recesses corresponds to at least 0.3 times a main extension of each pole shoe bridge. A "main extension" of an object in the present context is to be understood, in particular, as an extension of a longest edge of a smallest imaginary cuboid just sufficient to completely enclose the object. Preferably, a main extension of the material recesses corresponds to at least essentially 0.5 times a main extension of each pole shoe bridge. This helps to achieve an advantageous material reduction of the pole shoe bridges while at the same time ensuring sufficient mechanical strength of the pole shoe bridges.

It is also provided that the stator comprises an insulating element which comprises a plurality of insulating tabs which, in the assembled state of the stator, are arranged between stator windings arranged on the stator teeth and the stator yoke. The insulating element, in a non-assembled state, is at least essentially in a star shape. Preferably, the insulating element has an annular portion, from which the insulating tabs of the insulating element extend radially. The insulating element is provided, in particular, to electrically insulate the stator winding applied to the stator teeth against the stator yoke and/or to protect the stator windings applied to the stator teeth when the stator star is press-fitted to the stator yoke. The protection against mechanical damage of the stator windings is particularly necessary with a high winding fill factor, whereby each winding space between the stator teeth of the stator star is at least almost entirely filled by the stator windings. "Provided" is to mean, in particular, especially adapted and/or equipped. That an object is provided for a particular function is to mean, in particular, that the object fulfils and/or performs this particular function in at least one state of application and/or operation. The insulating element is formed, in particular, of an electrically insulating, flexible material, for example, an insulating paper or a plastic sheet, for example, a polyimide sheet. Advantageously, the insulating element is formed to be self-adhesive on one side. Prior to press-fitting the stator star, provided with the windings, to the stator yoke, the insulating element is placed on the end face of the stator windings. During pressing, the stator yoke bends the insulating tabs which come to lie between the stator teeth of the stator star on the stator windings. Mechanical loading by the stator yoke thus only acts on the insulating element during pressing. After pressing, the insulating tabs of the insulating element come to lie between the stator windings and the stator yoke and thus form an electric insulation between the stator windings and the stator yoke.

Preferably, after the stator star provided with windings is pressed into the stator yoke, the stator is injection-molded in plastic. When the stator is injection-molded in plastic, the connection ends of the stator windings need to remain free of plastic material for later connection with a printed circuit board. To achieve this, the metallic connection ends of the stator windings have to be sealed off during injection molding. To achieve this, the stator may comprise an end-side carrier element having a plurality of passages for insertion of the winding wire ends, which is provided for sealing off the winding wire ends during the molding-in process. In addition, the carrier element serves for positioning the connection ends of the stator windings with respect to the printed circuit board. The carrier element is preferably at least essentially formed by a plastic material. The carrier element is placed on the end side of the stator windings prior to injection-molding the stator in plastic material. The carrier element is positioned by means of integrally molded positioning elements facing toward the stator. The connection ends of the stator windings are inserted into the passages of the carrier element. An inner diameter of the passages corresponds at least essentially to an outer diameter of the connection ends of the stator windings. In the region of the passages, the carrier element comprises concentric elevations, which are provided within an injection molding die, for sealing off the connection ends of the stator windings. To position the printed circuit board on the stator, the carrier element includes at least one positioning element, for example at least one pin, which is integrally injection molded therewith, in particular.

The stator according to the present invention is not limited to the above-described application and examples. In particular, to fulfil the functionality described herein, the stator according to the present invention can include a number of individual elements, components and units other than the number mentioned here.

Further advantages can be derived from the following description of the drawing. In the drawing, examples are shown. The drawing, the description and the claims comprise various features in combination. The person skilled in the art will also suitably consider the features individually and will also bring them together in further suitable combinations.

SHORT DESCRIPTION OF DRAWINGS

Figure 2:
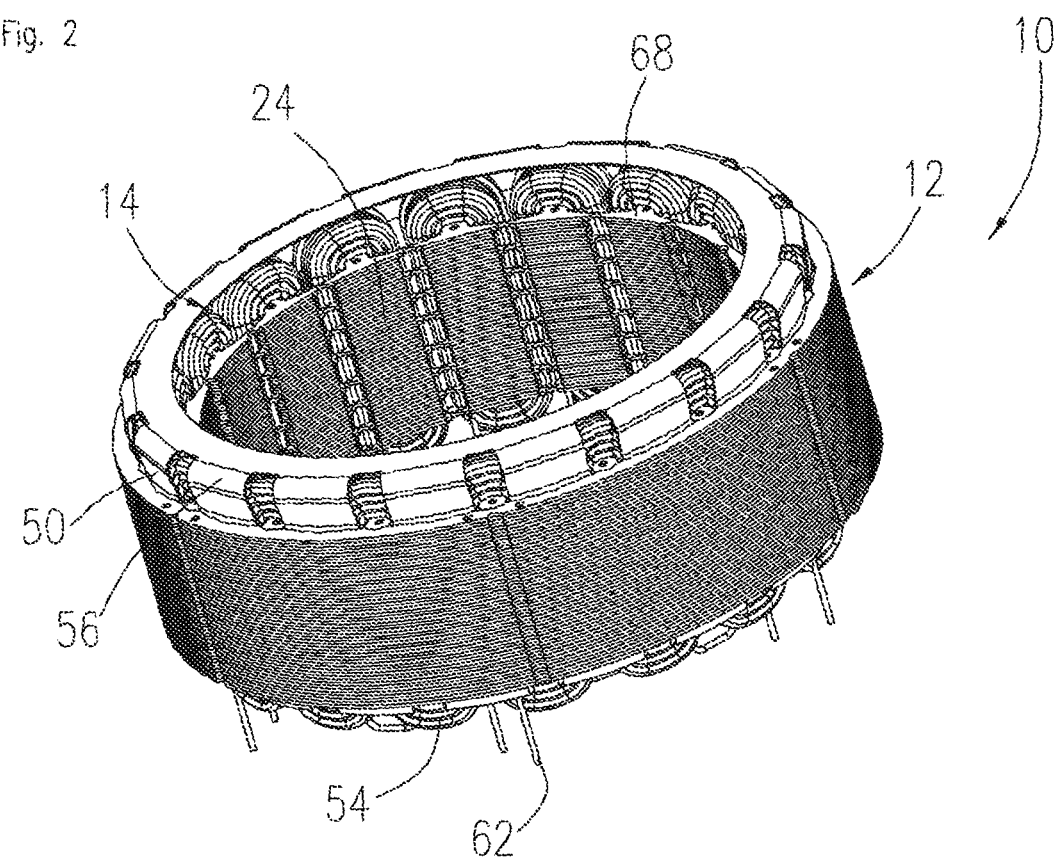
Figure 3:
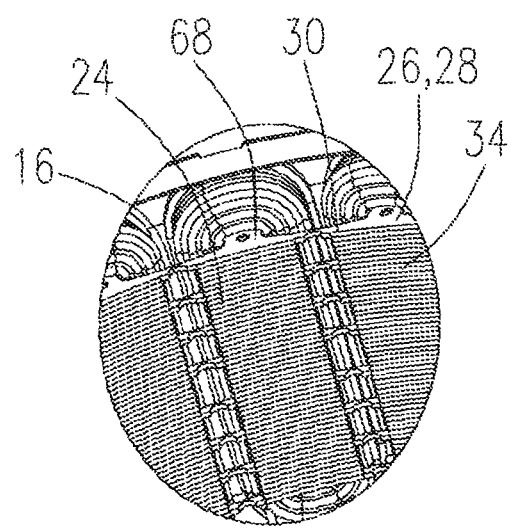
Figure 4:
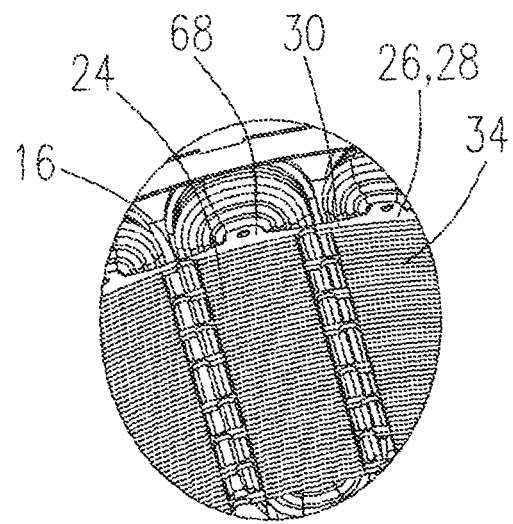
Figure 5:
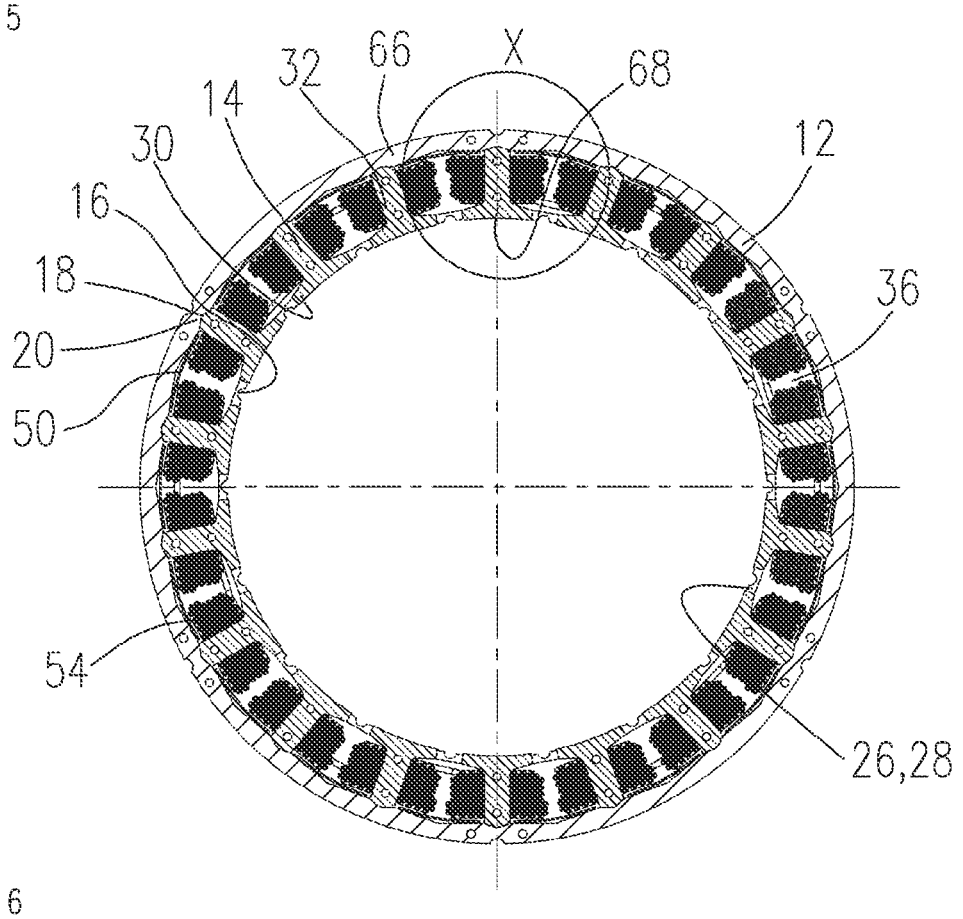
Figure 6:
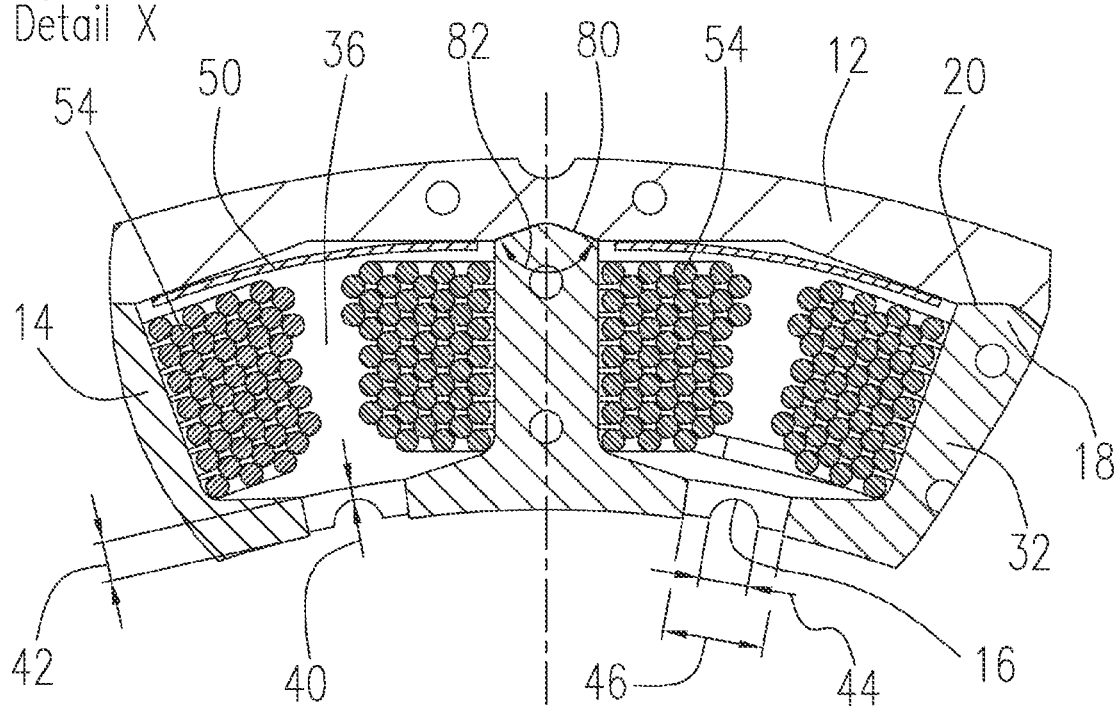
Figure 7:
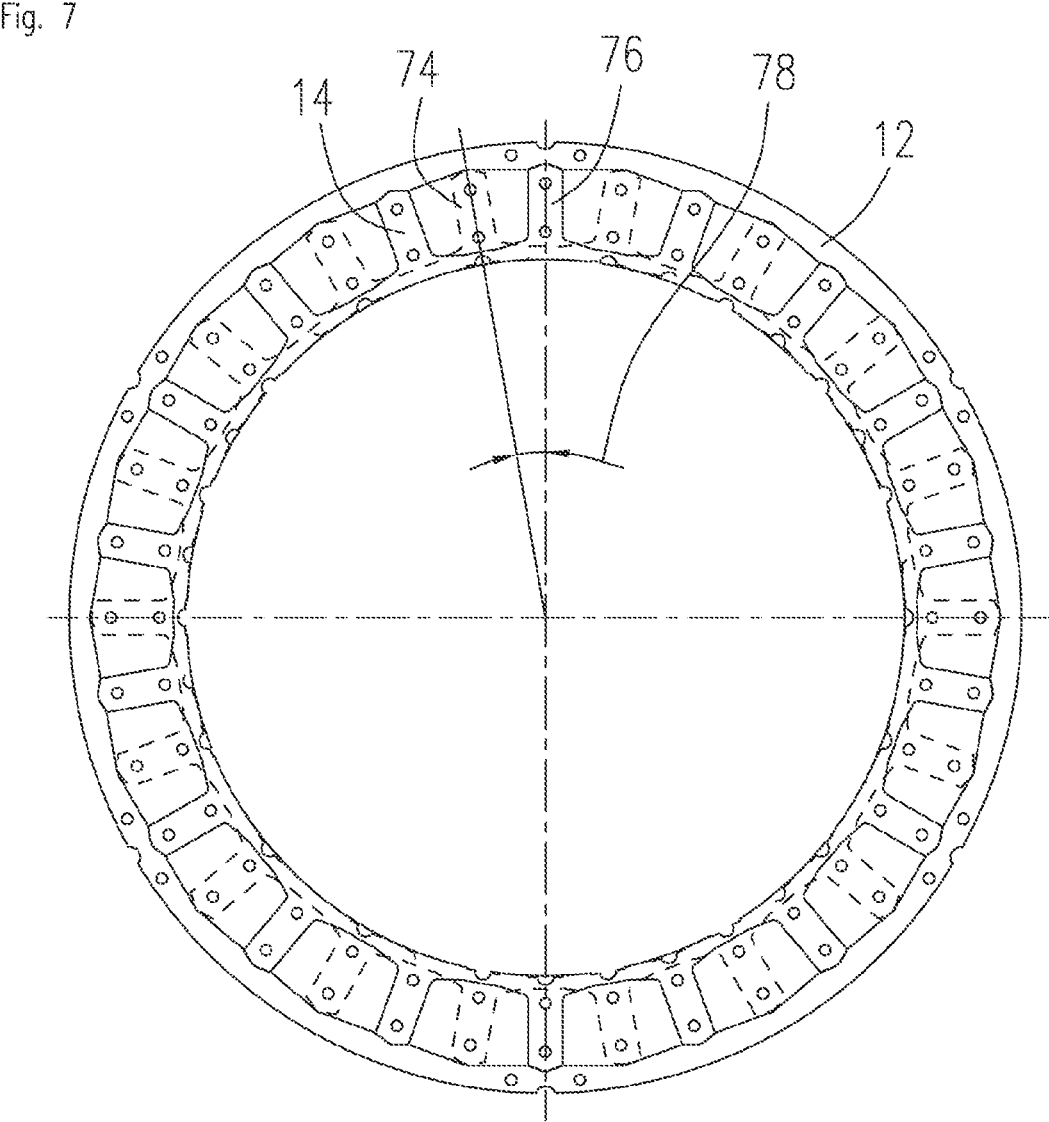
Figure 8:
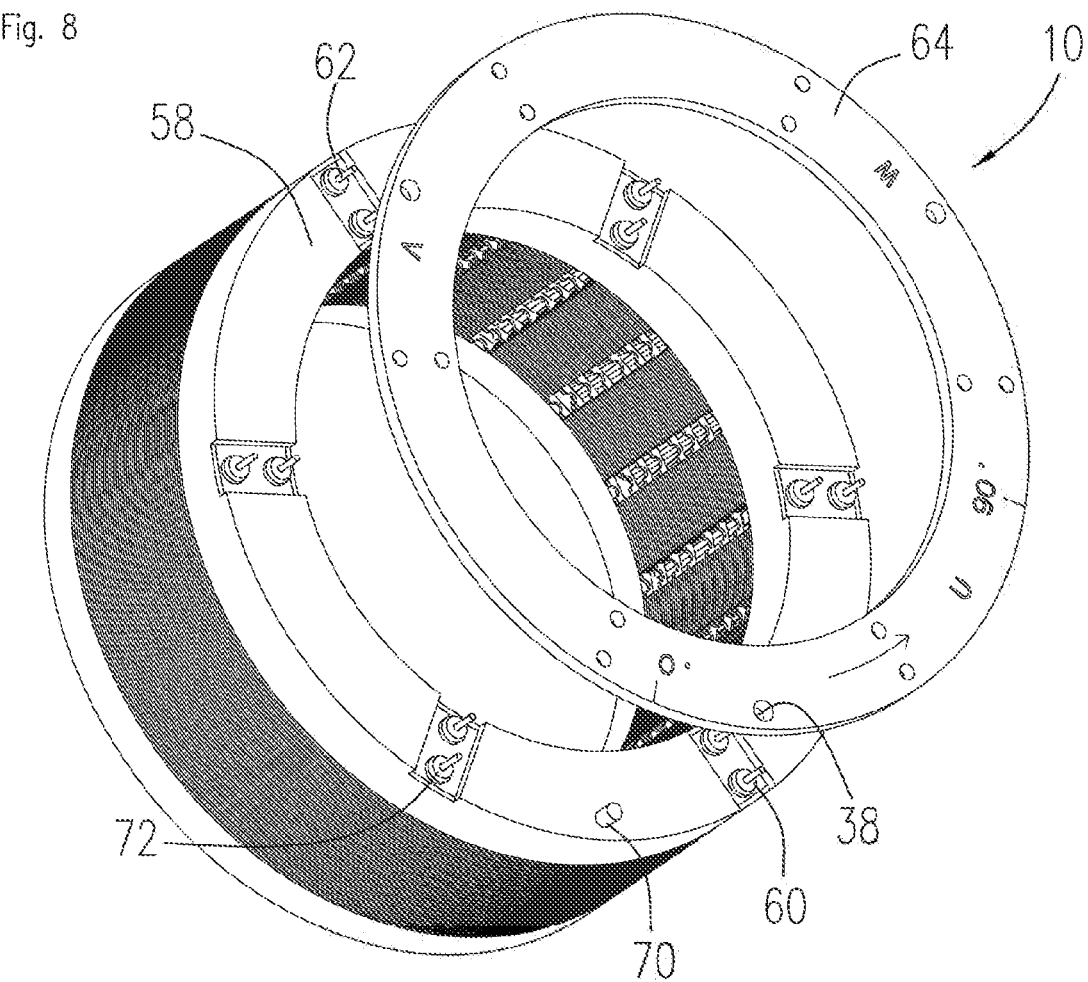
Figure 9:
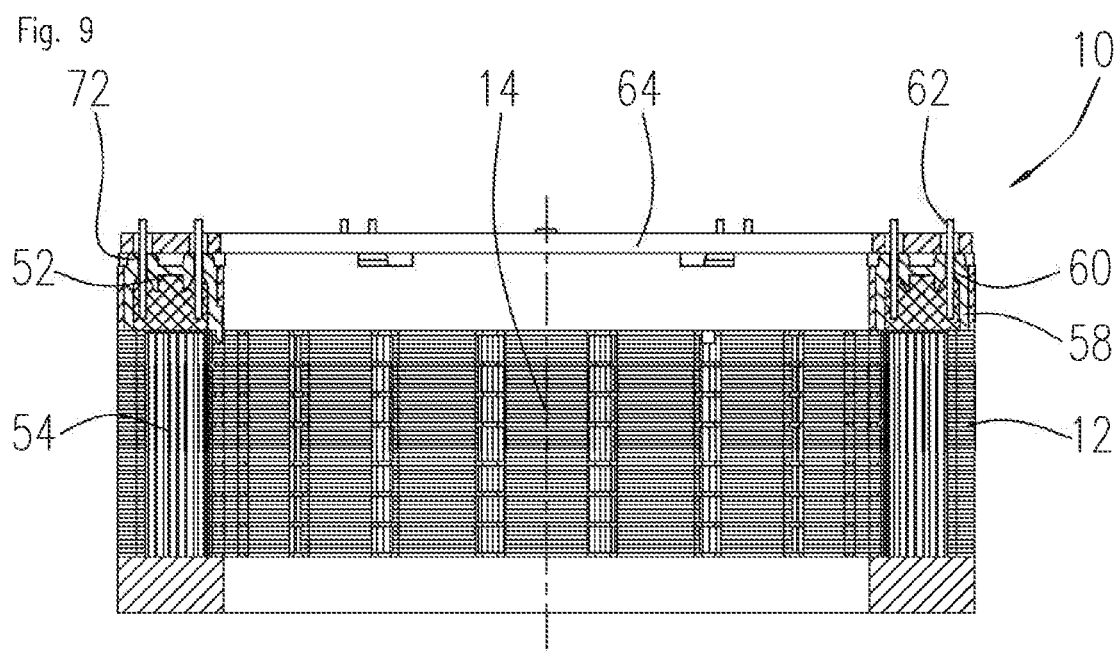
Figure 10:
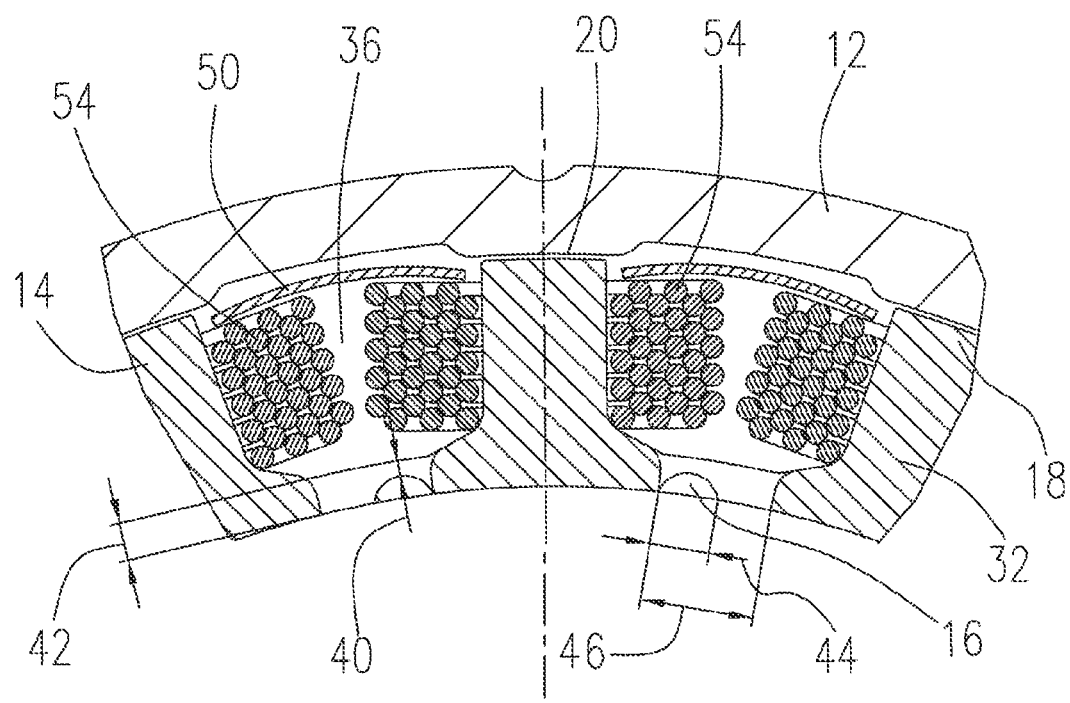

FIG. 1 shows an exploded view of a stator for an electric motor comprising a hollow cylindrical stator yoke and a stator star, FIG. 2 shows a perspective view of the stator yoke with the stator star pressed in, FIG. 3 shows a detail view of the stator star, FIG. 4 shows an alternative detail view of the stator star, FIG. 5 shows a section view of the stator, FIG. 6 shows a detail view of the section view of FIG. 5, FIG. 7 shows a schematic view of an offset between a stamped and assembled position of the stator star, FIG. 8 shows a perspective view of the stator in a state injection-molded in plastic material, FIG. 9 shows a section view of the stator of FIG. 8 with an assembled printed circuit board, and FIG. 10 shows a detail section view of an alternatively formed stator.

DESCRIPTION OF EXAMPLES

FIG. 1 shows an exploded view of a stator 10 for an electric motor formed as an internal rotor motor. The stator 10 comprises a hollow cylindrical stator yoke 12 and a stator star 14. In an assembled state shown in FIG. 2, the stator star 14 is arranged inside the stator yoke 12. FIG. 5 shows a section view of the assembled state of FIG. 2, and FIG. 6 shows a detail view of the section view of FIG. 5. The stator star 14 can be joined to the stator yoke 12, in particular, by means of pressing. The stator star 14 comprises a plurality of radially outwardly directed stator teeth 32. Stator windings 54 are applied on the stator teeth 32 of the stator star 14. On the side of the rotor, the stator teeth 32 each have one pole shoe 68. In the present example, the stator star 14 has 18 stator teeth 32. Alternatively, the stator star 14 can also have a number of stator teeth 32 other than 18. The tips 18 of the stator teeth 32, in the assembled state, contact corresponding connection positions 20 on the inner circumference of the stator yoke 12 (cf. FIGS. 5 and 6). The tips 18 of the stator teeth 32 have a press-fit oversize as compared to the connection positions 20. The press-fit oversize can be, for example, between 0.015 mm and 0.025 mm. The tips 18 of the stator teeth 32 are preferably rounded. The flanks 80 of the tips 18 of the stator teeth 32 form, in particular, an angle 82 of between 130° and 150°.

The stator yoke 12 and the stator star 14 are each formed by a stamped package of laminated metal sheets 22, 24. The metal sheet pack 22 of the stator yoke 12 comprises a plurality of stamped annular stator metal sheets 66 in a laminated pack. The stator star 14 is formed by a metal sheet pack 24 having radially outwardly extending stator teeth 32. The metal sheet pack 24 of the stator star 14 comprises sheet layers 26 consisting of stator sheets 28, closed in the circumferential direction, comprising stator teeth 32 connected with each other via pole shoe bridges 30 (cf. FIG. 5). The pole shoe bridges 30 each extend between the pole shoes 68 of adjacent stator teeth 32 of the stator sheets 28, closed in the circumferential direction, (cf. FIGS. 5 and 6). Moreover, the laminated sheet pack 24 of the stator star 14 comprises sheet layers 34 which consist of individual stator teeth 32 spaced with respect to each other in the circumferential direction. Between two sheet layers 26, which each consist of a stator sheet 28, closed in the circumferential direction, comprising stator teeth 32 connected with each other via pole shoe bridges 30, a plurality of sheet layers 34 is arranged in each case, which consist of individual stator teeth 32 spaced with respect to each other in the circumferential direction. On each end side, the sheet pack 24 of the stator star 14 is closed off by a sheet layer 26 comprising a stator sheet 28 closed in the circumferential direction. The laminated sheet packs 22, 24 are preferably created in a common package stamping process. The stator sheets 66 of the stator yoke 12 and the stator sheets 28 or individual stator teeth 32 of the stator star 14 are simultaneously stamped, wherein the stator sheets 28, or individual stator teeth 32 of the stator star 14, are stamped inside the stator sheets 66 of the stator yoke 12. As shown in FIG. 7, a stamping position 74 of the sheet pack 24 of the stator star 14 is offset by a predetermined angle 78 with respect to a later assembled position 76 of the sheet pack 24 of the stator star 14 in the metal sheet pack 22 of the stator yoke 12. In the example shown, the stamping position 74 of the sheet pack 24 of the stator star 14 is offset by 10° with respect to a later assembled position 76 of the sheet pack 24 of the stator star 14 in the sheet pack 22 of the stator yoke 12.

The pole shoe bridges 30 connecting the pole shoes 68 of the stator sheets 28, closed in the circumferential direction, each have at least one radially extending material recess 16. Each of the material recesses 16 is arranged on the pole shoe bridges 30 on the side of the rotor. In the example shown in FIG. 3, the material recesses 16 are arranged in an aligned position when seen in the axial direction. Alternatively, the material recesses 16 can also be arranged, as shown in FIG. 4, in a position offset from each other as seen in the axial direction. In particular, as shown in FIG. 4, the material recesses 16, on opposite sides of the pole shoe 68, are offset in opposite directions. The material recesses 16 are formed to have the shape of a circular segment. In the example shown, the material recesses 16 are formed to be essentially semicircular. A minimum radial material extension 40 of the pole shoe bridges 30 in the region of the material recess 16 corresponds to 0.2 to 0.5 times a radial material extension 42 of the pole shoe bridges 30 outside the region of the material recess 16. Preferably, the minimum radial material extension 40 of the pole shoe bridges 30 in the region of the material recess 16 corresponds to 0.3 to 0.4 times the radial material extension 42 of the pole shoe bridges 30 outside the region of the material recess 16. Moreover, the main extension 44 of the material recess 16 corresponds to at least 0.3 times a main extension 46 of each pole shoe bridge 30 (cf. FIG. 6). Preferably, a main extension 44 of the material recesses 16 corresponds to at least essentially 0.5 times a main extension 46 of each pole shoe bridge 30.

In addition, the stator 10 comprises an insulating element 48 including a plurality of insulating tabs 50. The insulating element 48 is formed, as shown in FIG. 1, in the non-assembled state shown, to be at least essentially star-shaped. The insulating element 48 has an annular portion 56 from which the insulating tabs 50 of the insulating element 48 extend radially. A number of insulating tabs 50 corresponds to a number of spaces 36 between the stator teeth 32. The insulating element 48 is preferably of an electrically insulating flexible material, for example an insulating paper or a polyimide sheet. In addition to the electric insulation of the stator windings 54 with respect to the stator yoke 12, the insulating element 48 is provided to protect the stator windings 54 applied to the stator teeth against mechanical damage when the stator star 14 is joined to the stator yoke 12 by pressing. Prior to pressing the stator star 14 provided with the windings into the stator yoke 12, the insulating element 48 is placed on the end face of the stator windings 54. Advantageously, the insulating element 48 is formed to be unilaterally self-adhesive at least in the region of the annular portion 56, serving to advantageously preliminarily fix the insulating element 48 on the stator windings 54. During pressing, the stator yoke 12 causes bending of the insulating tabs 50 in the direction of movement of the stator yoke 12. By means of bending, the insulating tabs 50 come to lie on the stator windings 54 between the stator teeth 32 of the stator star 14. Mechanical loading by the stator yoke 12 thus only acts on the insulating tabs 50 of the insulating element 48 during pressing. In an assembled state of the stator 10, the insulating tabs 50 are thus arranged, as can be seen, in particular, in FIGS. 5 and 6, between the stator windings 54 arranged on the stator teeth 32 and the stator yoke 12.

Preferably, the stator 10 is injection-molded in a plastic material after joining of the stator star 14, equipped with windings, to the stator yoke 12 by means of pressing. Such a stator 10 injection-molded in plastic is shown in FIGS. 8 and 9. During the process of injection molding the stator 10 in plastic, the connection ends 62 of the stator windings 54 have to be kept free of plastic material to be connected to a printed circuit board 64. To seal the connection ends 62 of the stator windings 54 with respect to a cavity of an injection molding die during the molding-in process, the stator 10 comprises an end-side carrier element 58. In addition to sealing, the carrier element 58 also serves to align the connection ends 62 of the stator windings 54 with respect to the printed circuit board 64. The carrier element 58 is preferably made of a plastic material. The carrier element 58 comprises a plurality of passages 60 for insertion of the connection ends 62 of the stator windings 54. The carrier element 58 is placed on the end side of the stator windings 54 prior to injection molding the stator 10 in plastic. The positioning of the carrier element 58 is carried out by means of positioning elements 52 integrally molded on the carrier element 58. For positioning the carrier element 58 in the circumferential direction, the carrier element 58 has at least one pin, for example, which engages a corresponding opening in the stator star 14. In particular, the carrier element 58 can comprise a plurality of pins arranged in the circumferential direction, which engage a corresponding number of respective openings in the stator star 14. Alternatively or additionally, the carrier element 58 can also be positioned in the circumferential direction by other suitable means. The carrier element 58 can thus have, for example, positioning elements, not shown, which cooperate directly with the winding heads of the stator star 14 for positioning the carrier element 58 in the circumferential direction.

The connection ends 62 of the stator windings 54 are introduced into and inserted through the passages 60 of the carrier element 58 during placement of the carrier element 58. An inner diameter of the passages 60 at least essentially corresponds to an outer diameter of the connection ends 62 of the stator windings 54 so that the outer diameter of the connection ends 62 causes at least substantial and preferably full sealing against the plastic material intruding in the direction of the connection ends 62 from the cavity of the injection molding die during the process of injection molding the stator 10 in plastic. In the region of the passages 60, the carrier element 58 additionally comprises concentric elevations 72. The connection ends 62 are introduced into recesses within the injection molding die, which are sealed off by the elevations 72 in the direction of the cavity of the injection molding die. An influx of plastic material into the recesses, in which the connection ends 62 are introduced, can thus be advantageously prevented.

After injection-molding the stator 10 in plastic material, the printed circuit board 64 is placed on the carrier element 58. The printed circuit board 64 has a circular configuration and, in an assembled state, is placed on the end side of the carrier element 58 (cf. FIG. 9). The printed circuit board 64 is provided for electrically connecting the stator windings 54. For this purpose, the connection ends 62 of the stator windings 54 are connected to the printed circuit board 64 in an electrically conducting manner, in particular, by means of solder connections. To position the printed circuit board 64 on the carrier element 58, the carrier element 58 comprises an axially extending pin 70 corresponding to an opening 38 in the printed circuit board 64.

FIG. 10 shows a detail section view of an alternatively formed stator 10 comprising a stator star 14 and a stator yoke 12. The stator star 14 can be joined to the stator yoke 12, in particular, by means of pressing. The stator star 14 comprises a plurality of radially outwardly directed stator teeth 32. Stator windings 54 are applied on the stator teeth 32 of the stator star 14. On the side of the rotor, the stator teeth 32 each include a pole shoe 68. The tips 18 of the stator teeth 32, in the assembled state, contact corresponding connection positions 20 on the inner circumference of the stator yoke 12. The tips 18 of the stator teeth 32 are preferably rounded. In the example shown in FIG. 6, the tips 18 of the stator teeth 32, on the end facing the stator yoke 12, have a circular-arc-shaped geometry corresponding to the outer circumference of the stator star 14.

LIST OF REFERENCE NUMERALS 10 stator
12 stator yoke
14 stator star
16 material recess
18 tip
20 connection position
22 sheet pack
24 sheet pack
26 sheet layer
28 stator sheet
30 pole shoe bridge
32 stator tooth
34 sheet layer
36 space
38 opening
40 material extension
42 material extension
44 main extension
46 main extension
48 insulating element
50 insulating tab
52 positioning element
54 stator winding
56 portion
58 carrier element
60 passage
62 connection ends
64 printed circuit board
66 stator sheet
68 pole shoe
70 pin
72 elevation
74 stamping position
76 assembled position
78 angle
80 flank
82 angle

What is claimed is:

1. A stator for an electric motor, comprising a hollow cylindrical stator yoke and comprising a stator star arranged within the stator yoke and including a plurality of radially outwardly extending stator teeth having tips contacting, in an assembled state, corresponding connection positions on an inner circumference of the stator yoke, wherein the stator yoke and the stator star are each formed by a laminated metal sheet pack, wherein the laminated metal sheet pack of the stator star comprises sheet metal layers of stator sheets, closed in a circumferential direction, comprising stator teeth-connected with each other via pole shoe bridges and sheet metal layers of individual stator teeth spaced with respect to each other in the circumferential direction, wherein each of the pole shoe bridges has at least one material recess extending in a radial direction, and wherein a minimum radial material extension of the pole shoe bridges in a region of at least one material recess corresponds to 0.2 to 0.5 times a radial material extension of the pole shoe bridges outside the region of the at least one material recess.

2. The stator according to claim 1, wherein the at least one material recesses are at least essentially shaped as circular segments.

3. The stator according to claim 1, wherein the at least one material recesses are each arranged on the rotor side of the pole shoe bridges.

4. The stator according to claim 1, wherein the at least one material recesses, as seen in the axial direction, are arranged to be aligned with each other.

5. The stator according to claim 1, wherein the at least one material recesses, as seen in the axial direction, are arranged to be offset from each other.

6. The stator according to claim 1, wherein a main extension of each at least one material recess corresponds to at least 0.3 times a main extension of each pole shoe bridge.

7. The stator according to claim 1, characterized by an insulating element comprising a plurality of insulating tabs which, in the assembled state of the stator, are arranged between stator windings arranged on the stator teeth and the stator yoke.

8. The stator according to claim 7, wherein the insulating element has an annular portion from which the insulating tabs of the insulating element extend radially.

9. The stator according to claim 1, characterized by an end-side carrier element comprising a plurality of passages for the insertion of connection ends of stator windings and provided for sealing the connection ends of the stator windings during a molding-in process.

10. An electric motor including a stator, the stator comprising a hollow cylindrical stator yoke and comprising a stator star arranged within the stator yoke and including a plurality of radially outwardly extending stator teeth having tips contacting, in an assembled state, corresponding connection positions on an inner circumference of the stator yoke, wherein the stator yoke and the stator star are each formed by a laminated metal sheet pack, wherein the laminated metal sheet pack of the stator star comprises sheet metal layers of stator sheets, closed in a circumferential direction, comprising stator teeth connected with each other via pole shoe bridges and sheet metal layers of individual stator teeth spaced with respect to each other in the circumferential direction, wherein each of the pole shoe bridges has at least one material recess extending in radial direction, and wherein a minimum radial material extension of the pole shoe bridges in region of the at least one material recess corresponds to 0.2 to 0.5 times a radial material extension of the pole shoe bridges outside the region of the at least one material recess.

\* \* \* \* \*

UNITED STATES PATENT AND TRADEMARK OFFICE
CERTIFICATE OF CORRECTION

PATENT NO. : 11,935,680 B2
APPLICATION NO. : 17/500000
DATED : March 19, 2024
INVENTOR(S) : Karl-Heinz Glatz et al.

It is certified that error appears in the above-identified patent and that said Letters Patent is hereby corrected as shown below:

In the Claims

In Column 9, Line 15, Claim 10 insert --a-- between "in" and "radial".

In Column 9, Line 17, Claim 10 insert --s-- between "in" and "region".

Signed and Sealed this
Thirtieth Day of April, 2024

Katherine Kelly Vidal
*Director of the United States Patent and Trademark Office*